(12) United States Patent
Gee et al.

(10) Patent No.: US 9,966,700 B2
(45) Date of Patent: May 8, 2018

(54) INFORMATION HANDLING SYSTEM SECURE DOCK

(71) Applicant: Dell Products L.P., Round Rock, TX (US)

(72) Inventors: Timothy R. Gee, Round Rock, TX (US); Christophe Daguet, Round Rock, TX (US); Mohammed K. Hijazi, Austin, TX (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 15/010,322

(22) Filed: Jan. 29, 2016

(65) Prior Publication Data
US 2017/0222366 A1 Aug. 3, 2017

(51) Int. Cl.
*G06F 21/88* (2013.01)
*H01R 13/639* (2006.01)

(52) U.S. Cl.
CPC ....... *H01R 13/639* (2013.01); *H01R 13/6397* (2013.01); *G06F 21/88* (2013.01)

(58) Field of Classification Search
CPC .................................................... H01R 13/639
USPC ........................................................... 726/35
See application file for complete search history.

(56) References Cited

U.S. PATENT DOCUMENTS

| 8,408,932 B2* | 4/2013 | Villarreal | H01R 13/6275 439/358 |
| 2017/0177029 A1* | 6/2017 | Nguyen | G06F 1/1632 |
| 2017/0201043 A1* | 7/2017 | Dong | H01R 13/639 |

* cited by examiner

*Primary Examiner* — Alexander Lagor
*Assistant Examiner* — Syed M Ahsan
(74) *Attorney, Agent, or Firm* — Terrile, Cannatti, Chambers & Holland, LLP; Robert W. Holland

(57) ABSTRACT

An integrated data and security cable couples to a portable information handling system with pins engaged at pin guides formed in the system housing on opposing sides of a data port. At least one pin selectively locks and unlocks in the pin guide to secure the system to a fixture, such as a desktop. The locking pin releases from the cable side with a key or combination or, alternatively, releases from the information handling system, such as under control of an embedded controller or other security system.

18 Claims, 8 Drawing Sheets

INFORMATION HANDLING SYSTEM SECURE DOCK

BACKGROUND OF THE INVENTION

Field of the Invention

The present invention relates in general to the field of information handling system communications, and more particularly to an information handling system secure dock.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have replaced desktop and other types of fixed information handling systems in many enterprise environments. Enterprise users have portable information handling systems at the office that readily pack into backpacks or briefcases to travel home or on business trips. With cellular network service and ready availability of WiFi hotspots, end users have access to enterprise information from remote locations so that end users can work on the go.

One downside to increased portability of information handling systems is that portable information handling systems are susceptible to theft. Many portable information handling systems have shrunk to small sizes that allow a thief to quickly stash a system out of sight. Theft of an information handling system represents more than theft of a valuable asset; theft of an information handling system often places sensitive enterprise and personal information at risk.

One solution that helps prevent information handling system theft is security cables that lock the information handling system to a desktop. Some enterprise security policies mandate employees to lock their personal computer at a desk; however, many employees either forget or outright disregard the policy. Employees often do not want to deal with the hassle of remembering cables, keys and combinations. For users who are coming into work, the security cable often presents another hassle after plugging in power, external display, network, peripheral and other cables.

SUMMARY OF THE INVENTION

Therefore, a need has arisen for a system and method which provides an information handling system cable lock that is convenient to use.

In accordance with the present invention, a system and method are provided which substantially reduce the disadvantages and problems associated with previous methods and systems for locking a portable information handling system to a desktop. An integrated data and security docking cable attaches to an information handling system port to secure the information handling system while providing docking station services. Communication through the docking port supports automated locking and unlocking of the security cable based upon policies of the user or an enterprise information technology administrator.

More specifically, an integrated data and security cable couples to a portable information handling system to serve as both a docking cable and a security cable that locks in place. Symmetrically disposed alignment and locking pins disposed on both sides of a cable connector allows reversible coupling of the integrated data and security cable to a portable information handling system sidewall. Rotational movement of the connector relative to the cable prevents excessive force from being asserted on the information handling system port while rotational movement of the security cable helps an end user lift and use the information handling system within the security cable length. Information exchanged between the docking cable connector and information handling system docking port determine automated locking and unlocking settings, such as consistent with policies set by information technology administrators. Locking of the docking cable, for instance, may be controlled from the docking station, the cable lock head and/or the information handling system based upon identification information exchanged between the docking station and information handling system during initial dock setup.

The present invention provides a number of important technical advantages. One example of an important technical advantage is that an end user connects to a docking station cable with an integrated lock, thus encouraging portable information handling system security. A single connector for both security and docking make security a convenient option for the end user and add automated security checks and backups that improve enterprise security and efficiency. For example, automated lock and unlock control from the portable information handling system itself reduces inefficiencies related to lost keys or forgotten combinations. Instead, the end user or an IT professional remotely interfaced with a system can secure and release the system. Further, unsecured systems may be locked down and made unusable until a secure cable is attached. Wireless cues, such as an end user's phone WLAN or WPAN signals help to track proximity of an end user to a portable information handling system so that docking cable locks are conveniently and automatically managed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An integrated data and security cable couples a portable information handling system to a desktop environment in a convenient, verifiable and secure manner. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
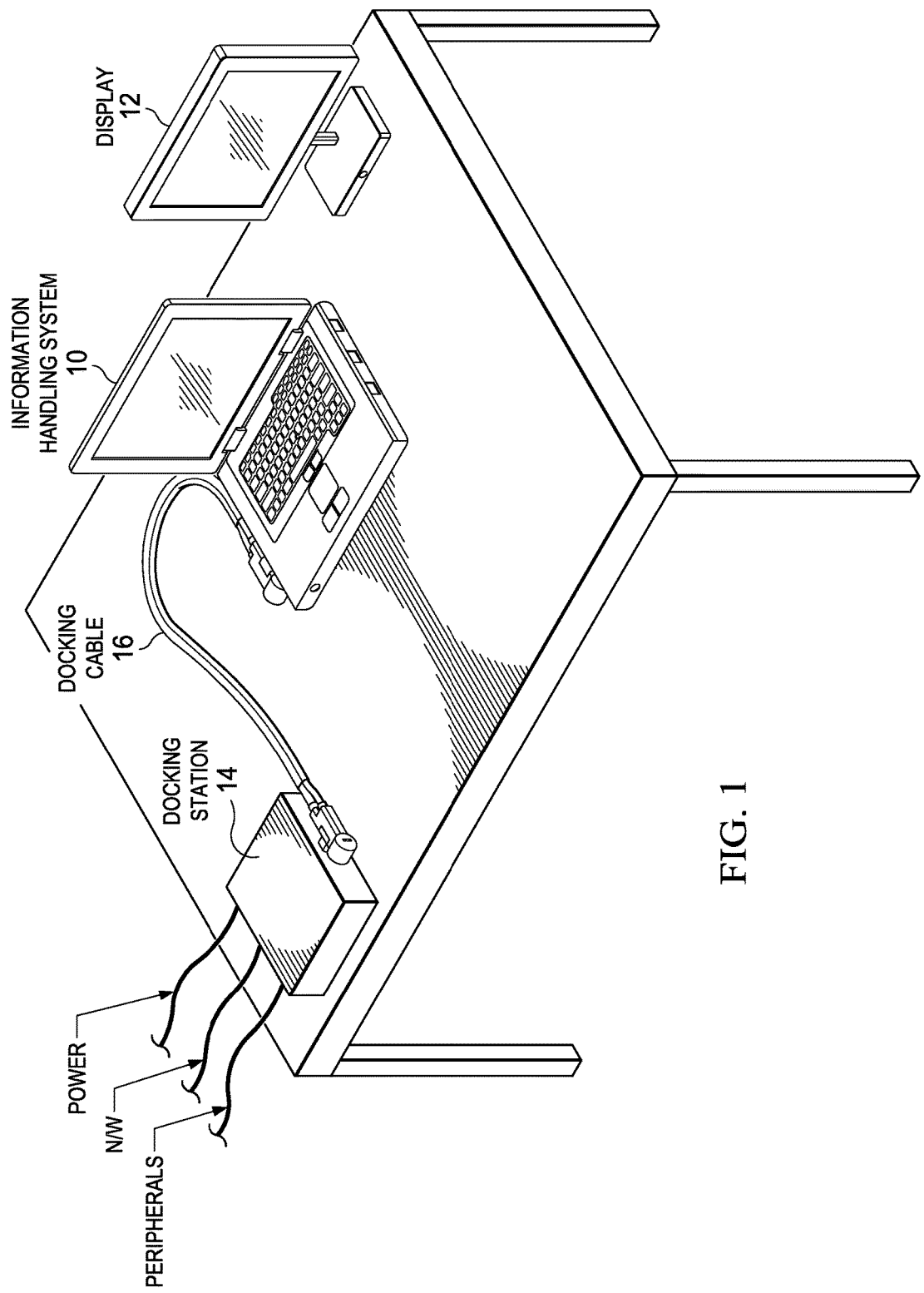
FIG. 1 depicts an information handling system in a desktop environment coupled to a docking station with an integrated data and security cable.

Referring now to FIG. 1, an information handling system 10 is depicted in a desktop environment coupled to a docking station 14 with an integrated data and security cable 16. The desktop environment is, for example, an office or cube area having peripheral devices that interact with portable information handling system 10. In the example embodiment, a peripheral display 12 couples to docking station 14 to present visual information of portable information handling system 10 that is communicated through docking cable 16 to docking station 14. Docking station 14 includes other resources that are accessible by portable information handling system 10, such as external power, wired local area network access and peripheral I/O devices (i.e., keyboard and mouse). Advantageously, docking cable 16 provides a single cabled access to docking station 14 without tying portable information handling system 10 to a single position. An end user who couples docking cable 16 to portable information handling system 10 may still pick up portable information handling system 10 for mobile use. Docking cable 16 does, however, prevent unauthorized removal of portable information handling system 10 from the desktop environment by integrating both a security cable and a data cable in a single assembly as set forth below.

Figure 2A:
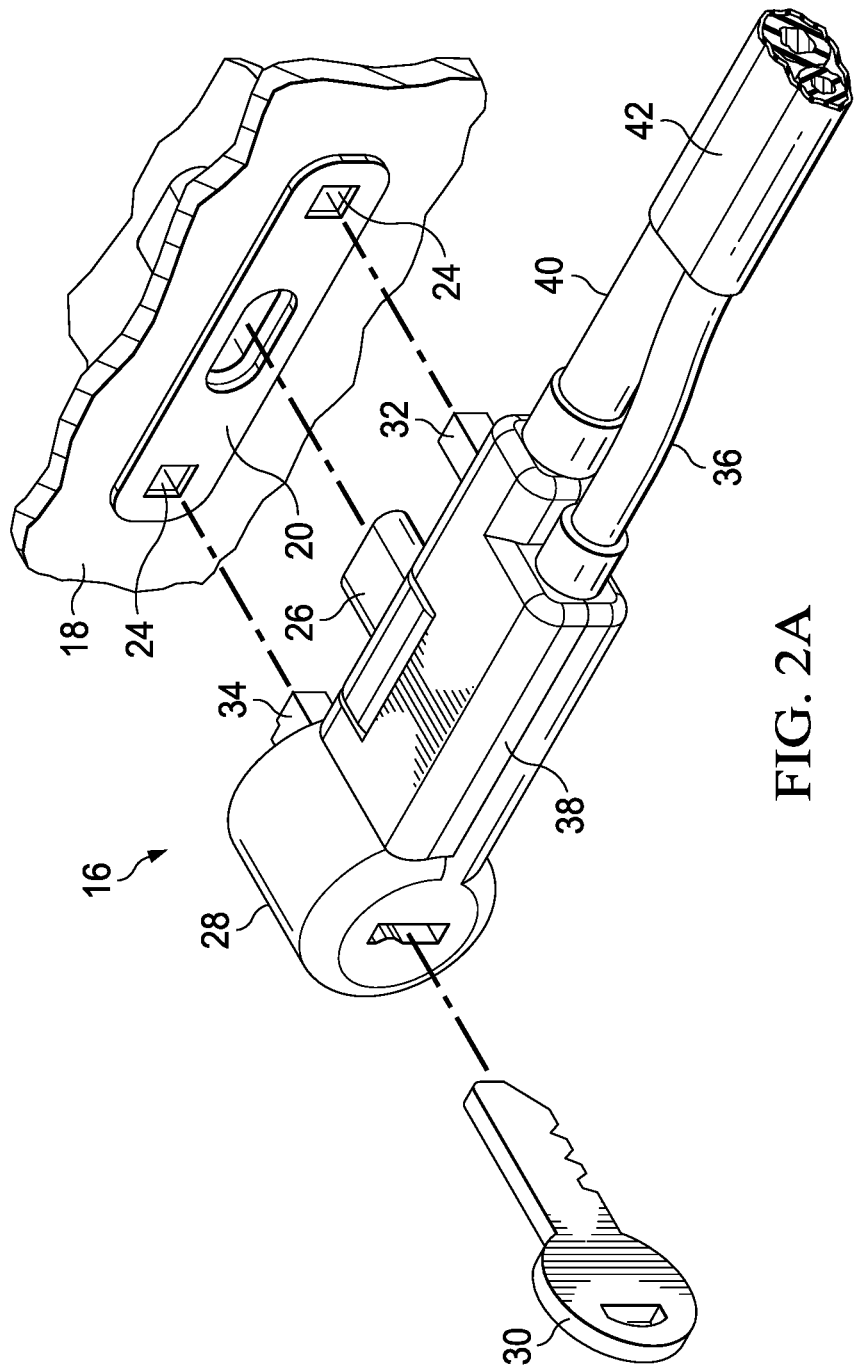
FIGS. 2A and 2B depict the integrated data and security cable aligned to couple to an information handling system.
Figure 2B:
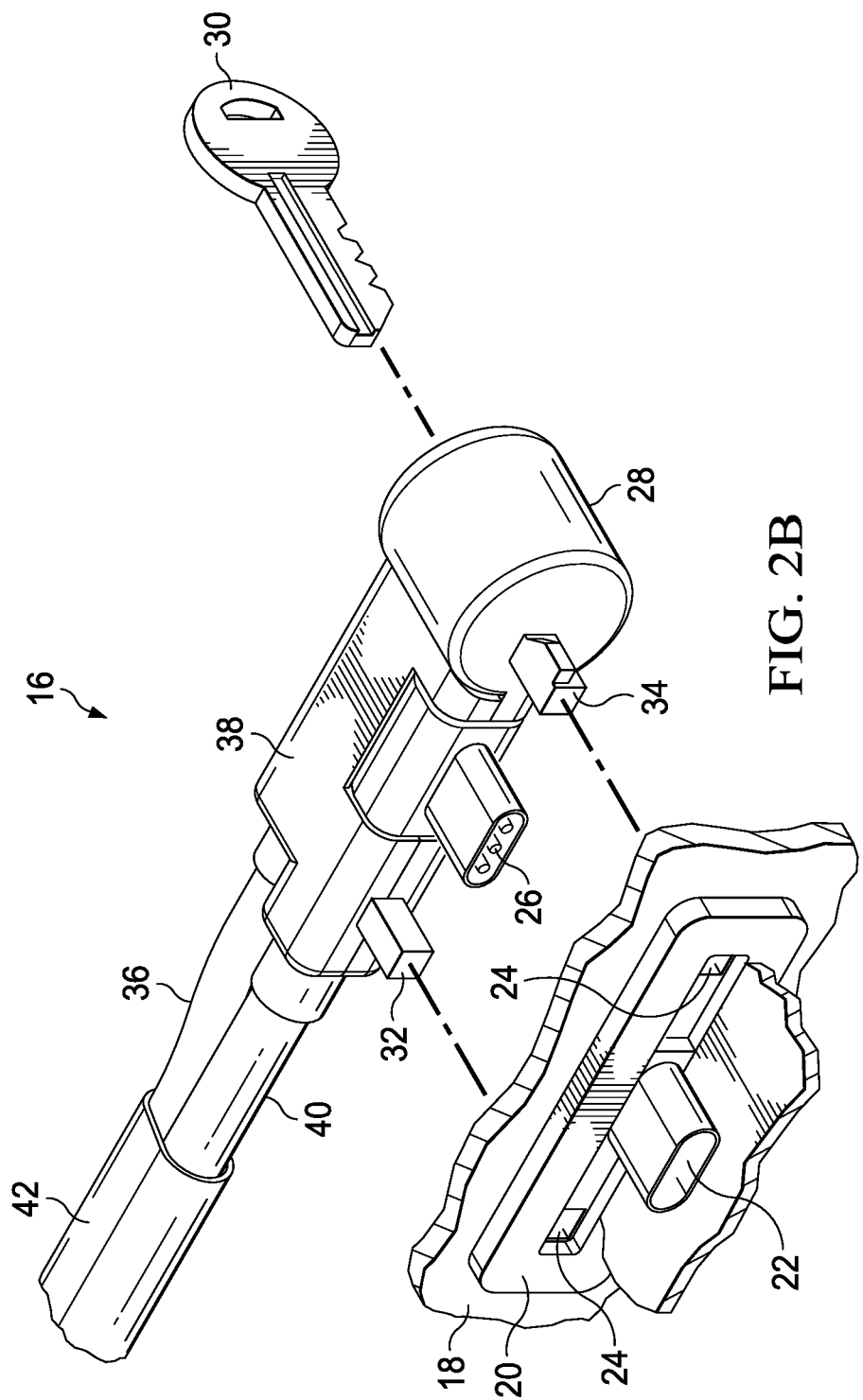

Referring now to FIGS. 2A and 2B, the integrated data and security cable 16 is depicted aligned to couple to an information handling system 10. FIG. 2A depicts docking cable 16 as viewed by an end user inserting cable 16 into sidewall 18 of portable information handling system 10. A die cast insert 20 securely attaches to sidewall 18 and integrates a USB Type C connector port 22 and a set of two pin guides 24 located on opposing sides of connector port 22 in a symmetric pattern that allows reversible coupling of docking cable 16 to information handling system 10. FIG. 2B depicts a view from inside of information handling system 10 to illustrate that connector port 22 communicates through a PCB interface with other processing components within information handling system 10, such as a USB hub or other interface to an embedded controller.

In the example embodiment depicted by FIG. 2, cable 16 includes a USB Type C connector 26 that inserts into port 22. In alternative embodiments, alternative types of connectors and ports may be used to provide communication with docking station 14, however, a USB Type C connector readily adapts to power and data needs of portable information handling systems when docked. Pin guides 24 securely integrate with insert 20 and accept pins of docking cable 16 to prevent movement of port connector 26 relative to port 22. A guide pin 22 engages one pin guide 24 on one side of port 22 and a lock pin 34 engages the pin guide 24 on the opposing side of port 22. Symmetrical positioning of pin guides 24 relative to port 22 allows reversible insertion of connector 26 into port 22 so that docking cable connects in either a forward or reverse disposition at information handling system 10. Lock pin 34 interfaces with a lock 28 and moves by a key 30 between locked and unlocked positions to selectively secure docking cable 16 to information handling system 10. Pin guides 24 include a locking engagement with lock pin 34 when key 30 orients lock pin 34 to a lock position. In alternative embodiments, lock 28 may lock with a combination or an electronic lock, such as lock that accepts a code by near field communication, Bluetooth or other interfaces.

In various embodiments, lock 28 and lock pin 34 cooperate to provide automated locking and unlocking of docking cable 16 based at least in part upon information communicated through port 22 and connector 26. The information may be provided from information handling system 10 to a docking station or vice versa, or may be managed with logic running proximate to lock 28, such as microcontroller that manages a solenoid disposed in cable 16. In one alternative embodiment, docking cable 26 enforces enterprise security rules that define when a portable information handling system is locked at a docking station and that are communicated from a server to docking station 14 and/or information handling system 10. Although the example embodiment depicts lock engagement and disengagement based upon actuation of lock pin 34, in alternative embodiments, a solenoid in pin guide 24 managed by an embedded controller of information handling system 10 may also selectively engage and disengage lock pin 34. For example, the end user may release cable 16 by either turning 30 to move lock pin 34 to an unlock position, or by changing the position of a lock element in pin guide 24 with a password provided to information handling system 10.

Advantageously, docking cable 16 provides flexibility in the control and programming of docking security procedures at different types of portable information handling systems. For example, an information handling system having highly sensitive data that detects a location based upon GPS or WLAN identifiers will require a user to attach a docking cable to port 22 before allowing access to data. The USB Type C docking interface provides varying additional control capability to drive auto locking and unlocking mechanisms. For instance, two factor authentication with a smart card reader, biometric device and or passcode may be required. In some instances, the authentication information may be input at docking station 14 with a fingerprint reader or keypad and verified locally at the information handling system 10 and a network interface communicated through port 22 and cable 16 in order to release information handling system 10 from the lock. By storing an encryption key in a secure storage location, information handling system 10 can only be unlocked when either the user or an administrator logs onto the system. Since portable information handling system 10 receives power through cable 16, connector 26 and port 22, the BIOS or other firmware manages locked and unlocked states via password, trusted password logic (a TPM key) or in a pre-boot mode.

Figure 3A:
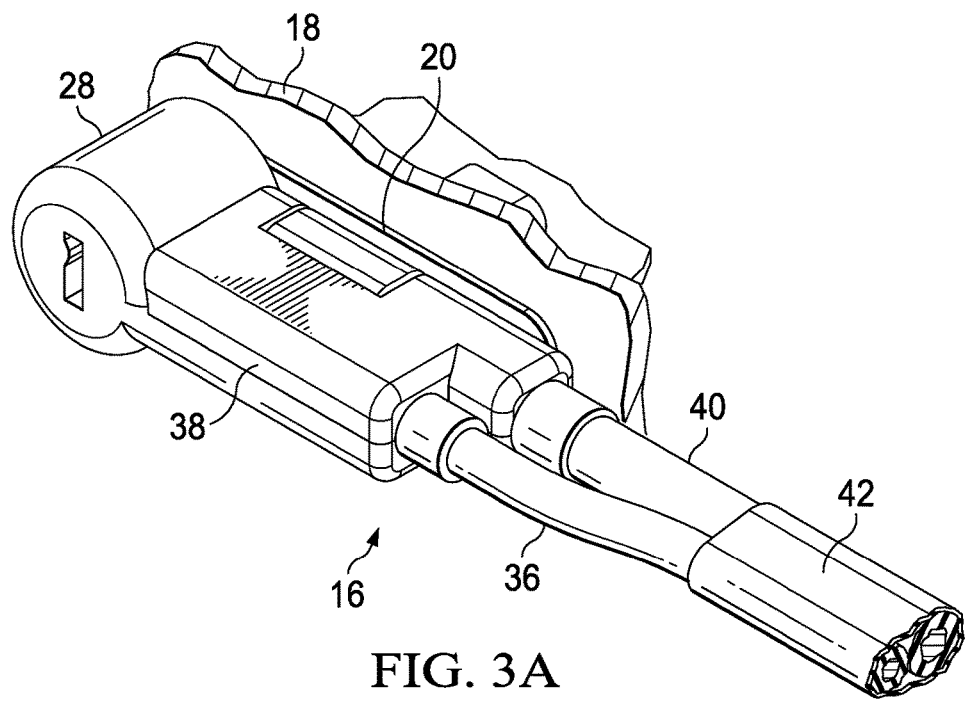
FIGS. 3A and 3B depict the integrated data and security cable coupled to an information handling system.
Figure 3B:
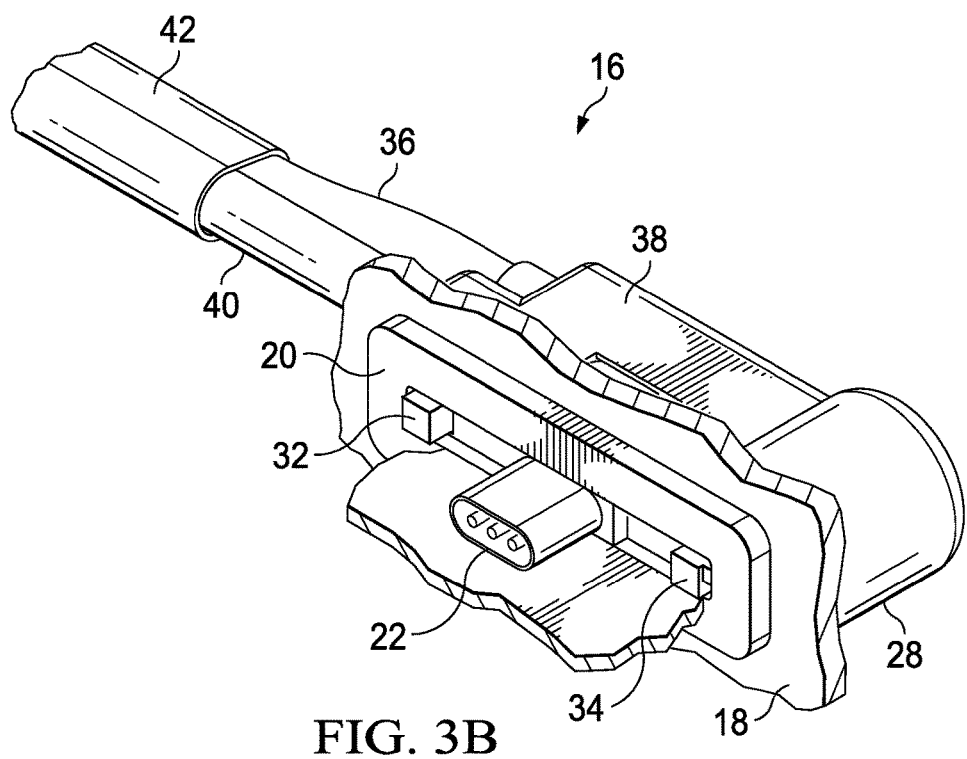

Referring now to FIGS. 3A and 3B, the integrated data and security cable are depicted coupled to an information handling system. Cable 16 securely engages against sidewall 18 to protect port 22 from forces introduced by cable 16. The outside surface of cable 16 is made of strong material, such as high grade steel or Kevlar fiber to prevent cutting and damage. Lateral forces and torsion translated through cable 16 to sidewall 18 are absorbed by guide pin 32 and lock pin 34 and the relation of cable 16 to sidewall 18 so that port 22 is protected from damage.

Figure 4:
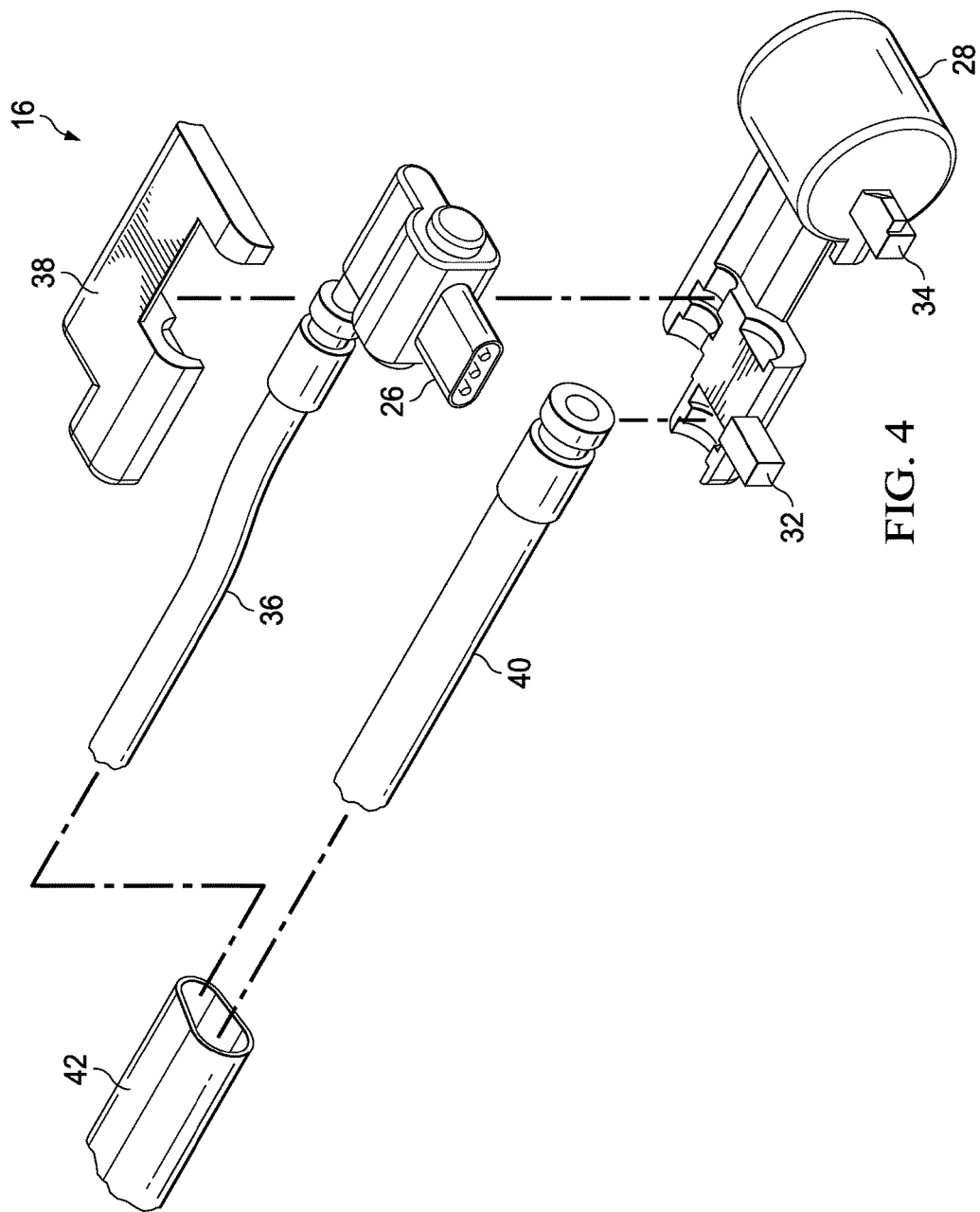
FIG. 4 depicts a blown-up view of the integrated data and security cable.

Referring now to FIG. 4, a blown-up view depicts the integrated data and security cable 16. Lock portion 28 is formed with lock pin 34 and guide pin 32 integrated in a die cast metal piece. Connector 26 has a data cable 36 that forms a curved housing proximate to connector 26. Connector 26 fits into a curved housing portion defined symmetrically located between guide pin 32 and locking pin 34 so that cable 26 has some freedom to rotate within lock portion 28 after assembly. A security cable 40 couples to lock portion 28 in a fitted rounded portion that provides freedom of cable 40 to rotate within lock portion 28 after assembly. A die cast cover 38 fits over cable 36, connector 26 and cable 40 to secure cable 36, connector 26 and cable 40 to lock portion 28. A sheath 42 slides over both data cable 36 and security cable 40 to provide convenient cable management for the end user.

Figure 5:
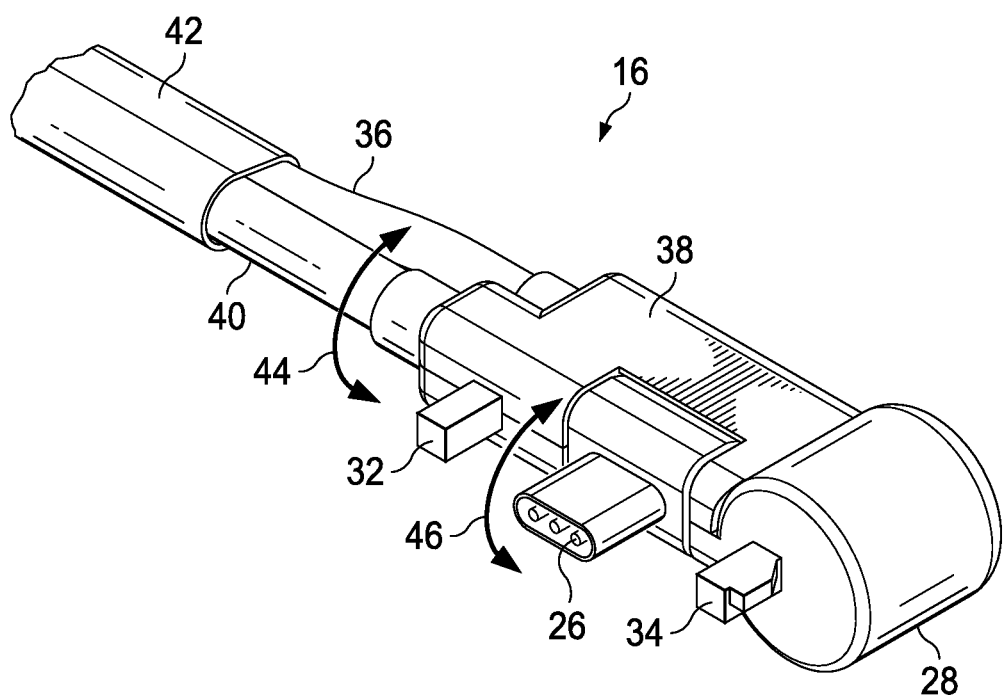
FIG. 5 depicts rotational movement available at the integrated data and security cable when coupled to an information handling system.

Referring now to FIG. 5, rotational movement is depicted that is available at the integrated data and security cable 16 when coupled to an information handling system. As set forth in FIG. 4, connector 26 and security cable 40 have freedom to rotate between lock portion 28 and cover 38. As depicted by arrow 44, security cable 40 rotates freely and independent any other portions of cable 16. Connector 26 rotates as depicted by arrow 46 to aid connector 26 from placing torsional forces at an information handling system port when cable 16 is coupled to an information handling system.

Figure 6:
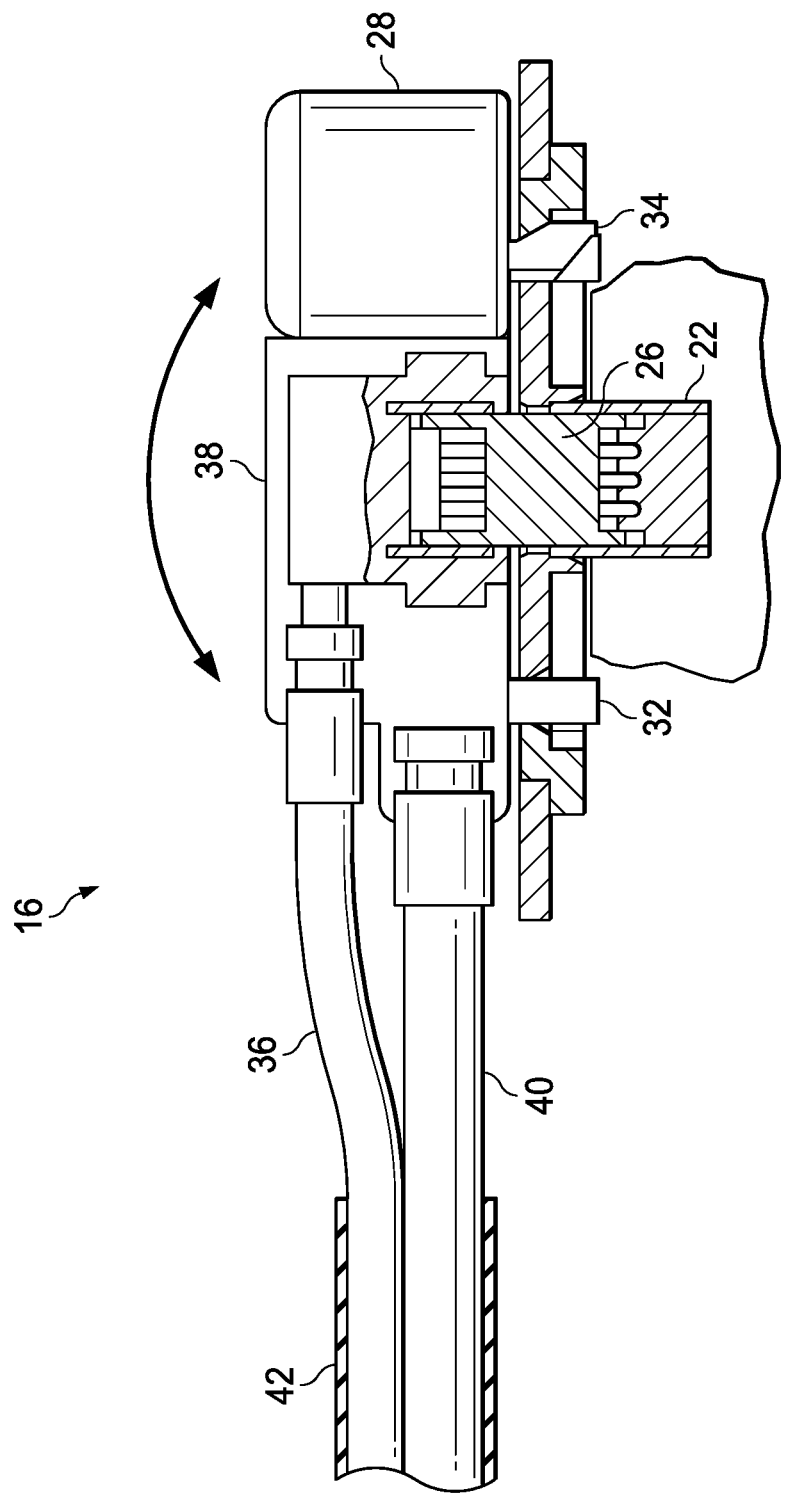
FIG. 6 depicts a cutaway view of the integrated data and security cable coupled to an information handling system.

Referring now to FIG. 6, a cutaway view depicts the integrated data and security cable 16 coupled to an information handling system 10. Connector 26 fully inserts into port 22 with alignment provided guide pin 32 and lock pin 34. Cable 16 abuts against information handling system 10 to minimize any torsion or other forces that work against connector 26 and port 22. Lock pin 34 has a locking engagement within information handling system 10 that is released by reorientation of locking pin 34, such as with rotation of a key. In addition, locking pin 34 is released if the engaging portion within information handling system rotates, such as under motivation provided by a solenoid or other device commanded by an embedded controller.

Figure 7:
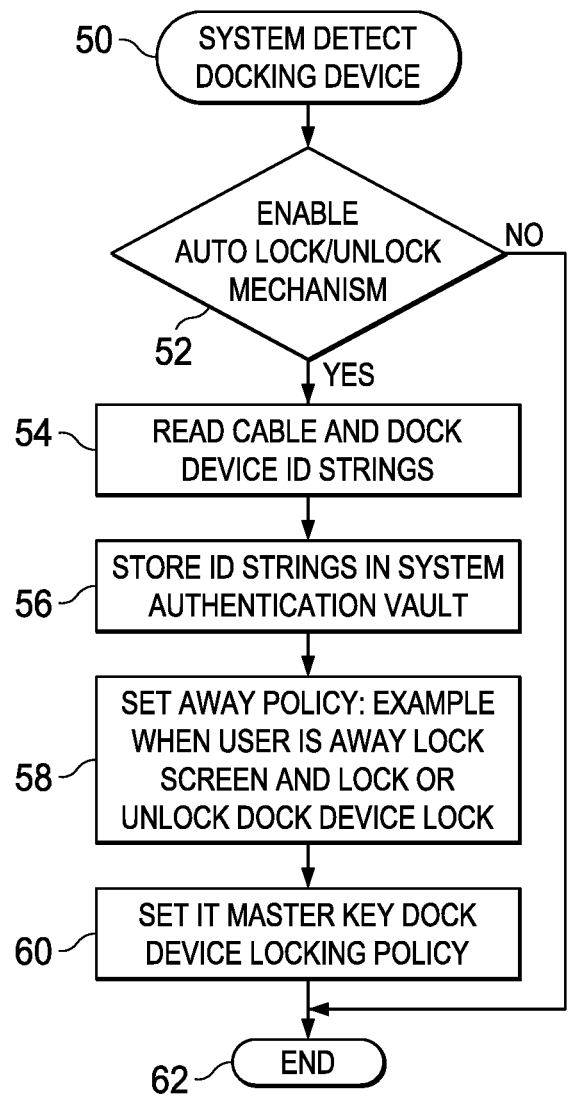
FIG. 7 depicts a flow diagram of a process for setting automated lock and unlock of the integrated data and security cable when coupled to an information handling system.

Referring now to FIG. 7, a flow diagram depicts a process for setting automated lock and unlock of the integrated data and security cable when coupled to an information handling system. At step 50, the information handling system detects an interface established with a docking device. At step 52 a determination is made of whether automated locking and unlocking of the docking cable is available. If not, the process ends at step 62. If automated locking and unlocking is available, the process continues to step 54 read the cable and dock device identification strings. At step 56 the identification strings are stored in the information handling system authentication vault or other appropriate location. At step 58, the security policy for the docking station and information handling system is determined and set. In one example embodiment, a set away policy might include automatically determining an absent user, such as with a camera or wireless signal of the user's phone, and locking the screen and docking cable when the user is away, while unlocking the screen and docking cable when the user is present. The set away policy may be locally stored on the information handling system or docking station, or may be sent to the information handling system as part of a docking procedure. At step 60, the information technology master key is set for the dock device locking policy so that administrators may obtain access to the information handling system if appropriate. The process ends with completed setup at step 62 and docking policy enforcement is initiated.

Although the present invention has been described in detail, it should be understood that various changes, substitutions and alterations can be made hereto without departing from the spirit and scope of the invention as defined by the appended claims.

What is claimed is:

1. A portable information handling system comprising:
a housing;
a processor disposed in the housing and operable to execute instructions to process information;
a memory disposed in the housing and interfaced with the processor, the memory operable to store the information;
a display disposed in the housing and interfaced with the processor and memory, the display operable to present the information as visual images;
a data port disposed at one side of the housing and configured to accept a data cable connector;
first and second pin guides disposed at the housing on opposing sides of the data port;
a pin lock disposed in at least one of the first and second pin guides, the pin lock configured to selectively lock and unlock at a pin inserted into the at least one of the first and second pin guides;
a lock controller integrated in the housing and interfaced with the pin lock, the lock controller operable to selectively lock and unlock the pin lock based at least in part on information communicated through the data port; and
a docking cable having a data port connector disposed between first and second pins, the data port connector configured to engage the data port and at least one of the pins configured to engage the pin lock.

2. The portable information handling system of claim 1 wherein the first and second pins are positioned symmetrically relative to the data port connector so that the docking cable connects to the information handling system in reversible orientations.

3. The portable information handling system of claim 2 wherein the data port connector comprises a USB Type C connector.

4. The portable information handling system of claim 1 wherein the information communicated through the data port comprises a command sent from a server to the lock controller.

5. The portable information handling system of claim 1 wherein the information communicated through the data port comprises a password stored at a docking station interfaced with the data port.

6. The portable information handling system of claim 1 wherein the information communicated through the data port comprises biometric information.

7. The portable information handling system of claim 1 wherein the information communicated through the data port comprises a password stored in a near field communication device.

8. A method for securing a portable information handling system, the method comprising:
   coupling a data connector cable to a data port disposed at the housing of the portable information handling system;
   securing the data connector cable to the housing with first and second pins disposed on opposing sides of the data cable connector and aligned to insert into pin guides;
   locking at least one of the first and second pins to a pin lock integrated in the housing; and
   selectively unlocking the pin lock based at least in part on information communicated through the data port and data connector cable;
   wherein locking at least one of the first and second pins further comprises: detecting insertion of the at least one of the first and second pins into the pin guides;
   and locking the at least one of the first and second pins in response to information communicated through the data port and data connector cable.

9. The method of claim 8 further comprising:
   removing the data connector cable from the housing;
   reversing the data connector cable relative to the housing; and
   inserting the data cable connector into the data port, the first and second pins inserting into the pin guides symmetrical to the data port.

10. The method of claim 9 wherein the data port comprises a USB Type C port.

11. The method of claim 8 wherein the information comprises a user password.

12. The method of claim 8 wherein the information comprises a user biometric information.

13. An integrated data cable and security cable for coupling a portable information handling system in place comprising:
   a lock portion having a locking pin and alignment pins disposed on opposing sides of a data cable connector housing portion, wherein at least one of the alignment pins is configured to engage the lock pin;
   a data cable connector disposed in the cable connector housing portion and having a data cable, wherein the data cable connector is configured to engage a data port;
   a security cable coupling to the lock portion; and
   a cover fit disposed the lock portion and coupled to the lock portion to trap the data cable connector in the data cable connector housing portion.

14. The integrated data cable and security cable of claim 13 wherein the cover and lock portion provide a rotational guide to rotate the data cable connector relative to the lock portion.

15. The integrated data cable and security cable of claim 13 wherein the security cable couples to the lock portion in a rotational guide to rotate the lock portion relative to the security cable.

16. The integrated data cable and security cable of claim 13 wherein the data cable connector comprises a USB Type C connector.

17. The integrated data cable and security cable of claim 13 wherein the locking pin and alignment pin are symmetrically placed relative to the data cable connector.

18. The integrated data cable and security cable of claim 13 further comprising a keyed lock in the locking portion operable to move the locking pin in an unlock direction.

* * * * *